US00RE41527E

(19) United States
(12) Reissued Patent
DeLean

(10) Patent Number: US RE41,527 E
(45) Date of Reissued Patent: Aug. 17, 2010

(54) METHOD FOR PERFORMING A COLOR SPACE TRANSFORMATION

(76) Inventor: Bruno DeLean, Avenida Merixell 20, Roc Escolls 2-6E, Andorra La Vella (AD)

(21) Appl. No.: 11/468,927

(22) Filed: Aug. 31, 2006

(Under 37 CFR 1.47)

Related U.S. Patent Documents

Reissue of:
(64) Patent No.: 6,621,604
Issued: Sep. 16, 2003
Appl. No.: 09/860,151
Filed: May 16, 2001

U.S. Applications:

(63) Continuation of application No. 11/229,449, filed on Sep. 16, 2005, which is a continuation of application No. 08/267,140, filed on Jun. 24, 1994, now Pat. No. 6,301,025.

(51) Int. Cl.
*G06F 3/08* (2006.01)

(52) U.S. Cl. ..... 358/518; 358/523; 358/525; 358/501

(58) Field of Classification Search ..... 358/518, 358/523, 525, 530, 501, 448, 443; 382/162, 382/167; 345/600, 601, 602, 604
See application file for complete search history.

(56) References Cited

U.S. PATENT DOCUMENTS

| | | | | |
|---|---|---|---|---|
| 3,893,166 | A | | 7/1975 | Pugsley |
| 4,275,413 | A | | 6/1981 | Sakamoto et al. |
| 4,328,515 | A | | 5/1982 | Wellendorf |
| 4,500,919 | A | | 2/1985 | Schreiber |
| 4,717,954 | A | | 1/1988 | Fujita et al. |
| 4,907,075 | A | | 3/1990 | Braudaway |
| 4,929,978 | A | | 5/1990 | Kanamori et al. |
| 5,185,661 | A | | 2/1993 | Ng |
| 5,200,816 | A | | 4/1993 | Rose |
| 5,204,665 | A | | 4/1993 | Bollman et al. |
| 5,212,546 | A | | 5/1993 | Arazi et al. |
| 5,331,439 | A | | 7/1994 | Bachar |
| 5,381,246 | A | | 1/1995 | Suzuki et al. |
| 5,412,491 | A | * | 5/1995 | Bachar ..... 358/500 |
| 5,506,661 | A | | 4/1996 | Hanzawa |
| 5,933,584 | A | | 8/1999 | Maniwa |
| 6,130,757 | A | | 10/2000 | Yoshida et al. |
| 6,301,025 | B1 | | 10/2001 | DeLean |
| 6,621,604 | B2 | | 9/2003 | DeLean |
| 6,778,289 | B1 | | 8/2004 | Iwata |
| 6,870,636 | B2 | * | 3/2005 | Kulkarni ..... 358/1.9 |
| 6,891,636 | B1 | | 5/2005 | Kawai et al. |
| 7,028,102 | B1 | | 4/2006 | Larsson et al. |
| RE40,637 | E | | 2/2009 | DeLean |
| 2001/0029531 | A1 | | 10/2001 | Ohta |

FOREIGN PATENT DOCUMENTS

| | | |
|---|---|---|
| GB | 2016238 | 9/1979 |
| IL | 1011972 | 3/1992 |
| WO | 94/06242 | 3/1994 |

* cited by examiner

*Primary Examiner*—Thomas D Lee
(74) *Attorney, Agent, or Firm*—Perkins Coie LLP

(57) ABSTRACT

A method for transforming a first image defined by a first multi-dimensional color space (RGB) into second image defined by a second multi-dimensional color space (CMYK). The method computes the transformation using information derived from a previous transformation of said second image into said first image. The method then minimizes the error produced while transforming the second image back into the first image. As such, an image editing system can display on a video monitor an image that is defined in one multi-dimensional color space (RGB), print using a printer that prints images using a second multi-dimensional color space (CMYK) and edit an image using any multi-dimensional color space (either RGB or CMYK) that facilitates rapid and accurate image editing.

20 Claims, 3 Drawing Sheets

TABLE G GENERATION ROUTINE 200

TRANSFORMATION ROUTINE 300

METHOD FOR PERFORMING A COLOR SPACE TRANSFORMATION

Matter enclosed in heavy brackets [ ] appears in the original patent but forms no part of this reissue specification; matter printed in italics indicates the additions made by reissue.

RELATED APPLICATIONS

[This] *More than one reissue application has been filed for the reissue of U.S. Pat. No. 6,621,604. The reissue applications are application Ser. Nos. 11/229,449 (parent of the present application), filed Sep. 16, 2005, and 11/468,927 (the present application), filed Aug. 31, 2006. The present* application *is a continuation of U.S. patent application Ser. No. 11/229/449, filed Sep. 16, 2005, which in turn is a reissue of U.S. patent application Ser. No. 09/860,151, filed May 16, 2001, now issued as U.S. Pat. No. 6,621,604, which is* a continuation of U.S. patent application Ser. No. 08/267,140, filed Jun. 24, 1994, now *issued as* U.S. Pat. No. 6,301,025.

BACKGROUND OF THE DISCLOSURE

1. Field of the Invention

The invention relates to image processing systems. More particularly, the invention relates to a method for accurately transforming color information between two color spaces having differing dimensions, e.g., between a red-green-blue (RGB) color space and a cyan-magenta-yellow-black (CMYK) color space and vice versa.

2. Description of the Background Art

In printing, image retouching and image processing, it is often necessary to convert colors from one representation (color space) into another. Many computer video monitors and scanners, for example, use red-green-blue (RGB) representations for colors, while printers typically represent colors in terms of the amounts of a variety of differently colored inks (for example, cyan-magenta-yellow-black (CMYK)). As such, in a typical computer system, the RGB color space used to produce an image upon a computer screen must be converted into a CMYK color space to facilitate printing of the image depicted on the screen. However, for any particular two color spaces, it is in many instances much easier to convert in one direction than the other, e.g., convert from CMYK to RGB. For example, converting from CMYK to RGB is relatively easy because the CMYK space has more dimensions than the RGB space.

Specifically, an important task in photocompositing is to take a set of images in CMYK format, modify them, and output the result in CMYK. Many of the intermediate operations (image modifications) are more easily or effectively accomplished in RGB space, so it is often necessary to convert from CMYK to RGB and then back to CMYK. One problem with such a transformation is that a CMYK color space is a four-dimensional space and an RGB color space is a three-dimensional space, so the transformation from CMYK to RGB, though relatively simple, inherently loses color information. In particular, the color information produced by "black generation" during creation of the CMYK image is lost. Black generation describes an amount of black ink substituted for equal parts of Cyan, Magenta and Yellow for printing purposes. Consequently, it is very important that an image processing system be able to convert from CMYK to RGB and back to CMYK and produce a black component of the CMYK image that closely approximates the black component in the original CMYK image.

Thus, a difficult and widely needed color transformation is the transformation from an RGB color space to a CMYK color space that retains, as closely as possible, the black generation of the original CMYK image. U.S. Pat. No. 4,500,919 discloses a particular method for converting from RGB to CMYK which is called the Ink Correction Model (ICM). The patent mentions that the ICM ". . . could be implemented in one huge lookup table, but this would be uneconomic and would also give no clue as to how to find the data to be stored in the LUT short of an impossibly large printing test." [11:21] Since the time of filing of '919 patent, the cost of memory has been reduced sufficiently that it is no longer uneconomic to use "one huge lookup table". Furthermore, the '919 patent states that, in using a table based transformation, a large printing test must be conducted to facilitate color space transformation calibration. However, such printing tests are time consuming and complicate the transformation process.

Therefore, a need exists in the art for a method that rapidly and accurately transforms images from a first multi-dimensional color space, e.g., RGB, into a second multi-dimensional color space, e.g., CKYK, without using a printing test and which preserves as closely as possible the black generation of an original CMYK image.

SUMMARY OF THE INVENTION

The present invention overcomes the disadvantages heretofore associated with the prior art. Specifically, the present invention converts pixel values from one color space to another, e.g., RGB to CMYK, using a table of interpolated values. The values in the table are filled using data derived from sample images which have been previously converted in the other direction, e.g., CMYK to RGB. The invention infers from those sample images enough about the forward transformation to build an inverse transformation in the table.

In order to convert from RGB to CMYK while retaining as closely as possible the black generation of the original CMYK files, the present invention examines the CMYK files and implicitly infers a black generation model. It does this by creating a table in RGB space of the CMYK values found in the files. At the beginning, each sample of the RGB table is initialized with a value determined from a default transformation of RGB into CMYK using any default black generation strategy. The choice of this transformation is not very important because it is highly modified in the following steps performed by the invention. Next, each pixel of each CMYK image used for creation of the table is converted into RGB, and then the appropriate entries in the RGB-space table are modified so that the interpolation of the table entries at the RGB values yields a value as close as possible to the CMYK pixel color. Once the table has been constructed, it may be low-pass filtered (smoothed), so that the values are highly continuous and no visible artifacts can be identified in the conversion. If the CMYK values of the input images are converted to RGB and the resulting RGB values are converted back to CMYK using the table described above, the original CMYK values with their original black generation are reconstructed with high accuracy as long as all the input images used the same black-generation strategy. If several input images are used that were created with different black-generation strategies (different UCR, GCR, and the like), the table is constructed using an average of the different strategies.

A key advantage of the current invention is that the user need not know anything about the black-generation strategy used in the CMYK file. It is inferred automatically by the inventive method. In situations where people are collaborating over long distances and it is impractical to do a large series of printing tests to facilitate optimization of the color space transformation process, the invention has great advantages over the prior art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
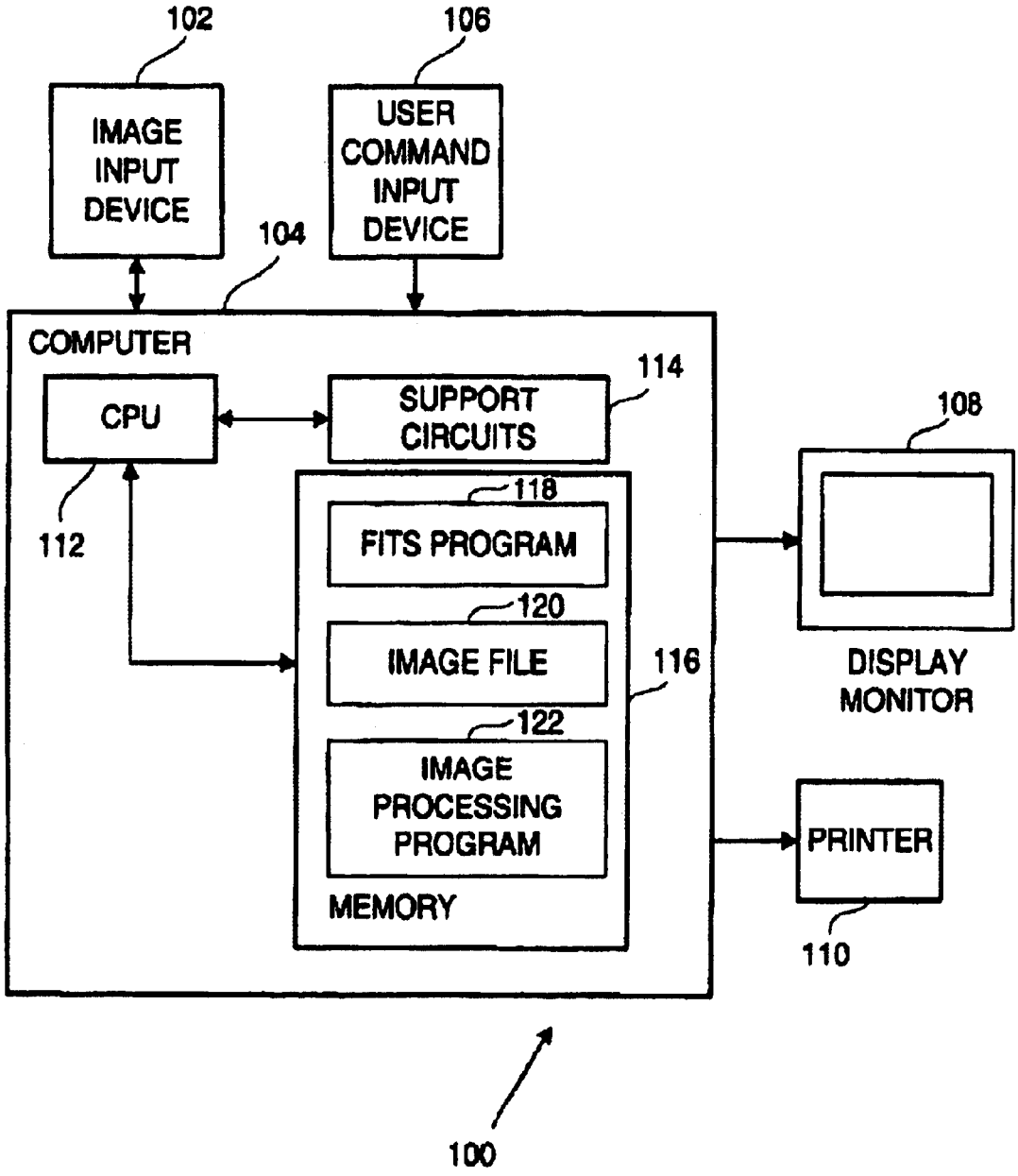
FIG. 1 depicts a computer system capable of executing an image processing program as well as a color space transformation program in accordance this the present invention.

FIG. 1 is a block diagram of a conventional computer system 100 capable of executing a color space transformation computer program 118. This program contains a routine that implements the method of the present invention to transform an image based in a first color space into an image based in a second color space. As such, the images can then be respectively printed and displayed on a printer 110 and a display monitor 108 even though the printer and display monitor utilize differing types of color spaces to produce an image.

Specifically, the computer system 100 contains an image input device 102, a computer 104, a user input device 106, a display monitor 108 and a printer 110. In operation, an original image is created by an image input device 102 such as a conventional image scanner. The scanned image (also referred to herein as a source image or original image) is formatted by the scanner into an image file 120 using a particular color space (e.g., RGB or CMYK). The image is then stored in the memory 116 within computer 104. Alternatively, the original image could be generated by a drawing or drafting program (shown generally as image processing program 122) executed on the computer 104 or another computer and stored, as image file 120, in memory 116. The computer 104 contains at least one central processing unit (CPU) 112, memory 116, and various well-known CPU support circuits 114. An illustrative computer is a Macintosh Quadra model 900 manufactured by Apple Computer, Inc. of Cupertino, Calif. The transformation program 118 and the image editing program 122 as well as one or more images are stored in the memory 116.

In operation, a user typically manipulates the user command input device 106 such as a mouse, trackball, light pen, and/or keyboard, to control, via the computer 104, the image input device 102, e.g., an image scanner. The image scanner, in a conventional manner, scans a hardcopy of an image and stores a digitized representation of the hardcopy in the memory 116 as an image file 120. Subsequently, the user can instruct the CPU 112 to execute the image processing program 122 and also to recall an image file (original image) from the memory. The image processing program 122 interacts, as necessary, with the transformation program 118 to facilitate color space transformation and display of the image on the monitor 108 and the printer 110.

Broadly speaking, the transformation program 118 contains an executable routine that transforms a color space having n-dimensions to a color space having m-dimensions. In particular, consider a transformation T: $R^n \rightarrow R^m$ from an n-dimensional color space to a m-dimensional space and suppose that n>m. For example, $R^n$ may be a CMYK color space and $R^m$ may be an RGB color space. Since n has more dimensions than m, the mapping transformation T will generally be many-to-one. In other words, there are typically many different colors x in $R^n$ such that T(x)=y where y is a given color. In the general case, there will be an (n−m)-dimensional set of colors x such that T(x)=y for any given y.

Inverting T is problematic. Since T is many-to-one, there is no full inverse $T^{-1}$ such that $T^{-1}(T(x))=x$ for all x. Nonetheless, to perform accurate inverse color transformations in practical situations, it is important to be able to recover x as closely as possible from T(x).

The present invention makes use of the observation that even though $R^n$ is a higher-dimensional space than $R^m$, for many purposes, not all of $R^n$ is used to produce colors in an image. In fact, usually no more than an m-dimensional subspace of $R^n$ is used to produce a pixel color. Hence, for many purposes, it suffices to invert T(x) on an m-dimensional subspace.

Figure 2:
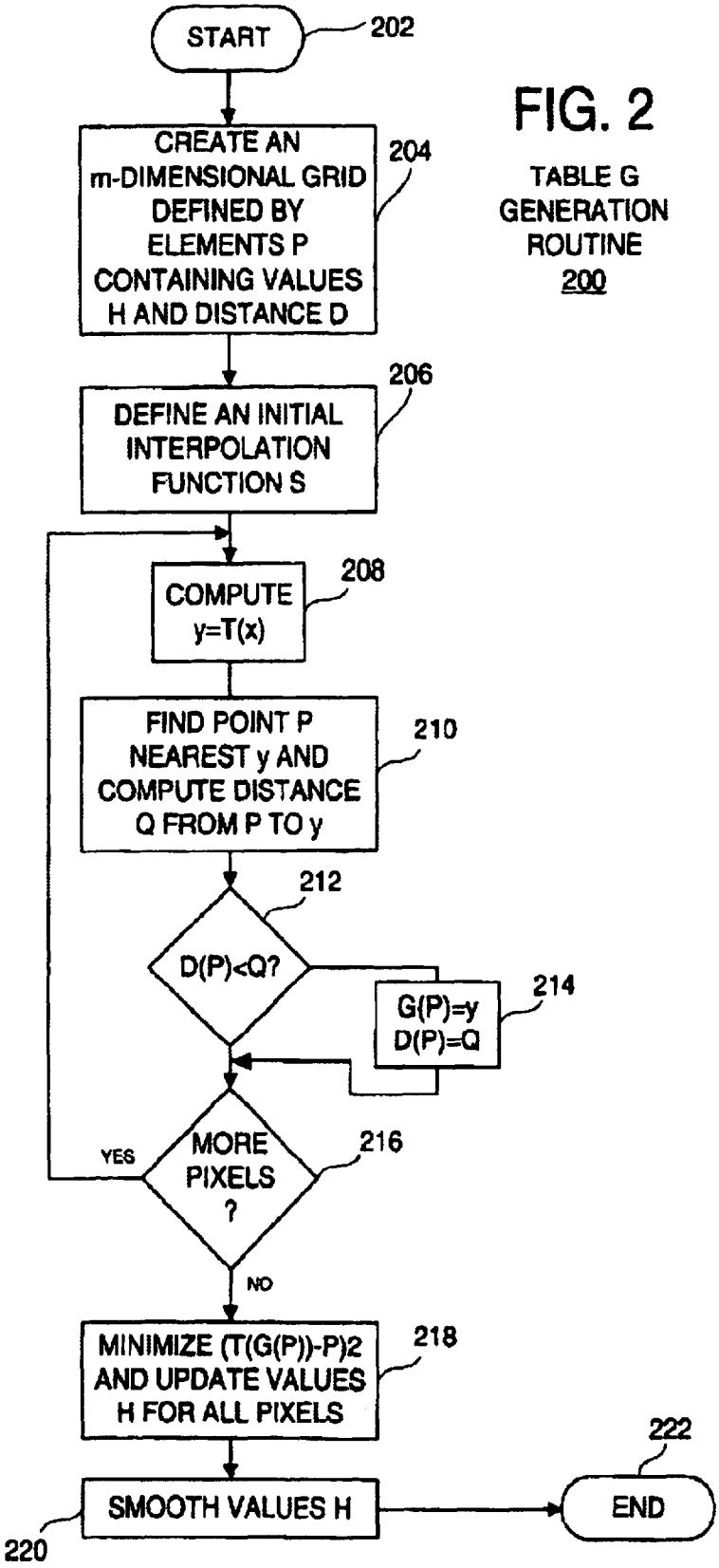
FIG. 2 depicts a flow chart of a color space transformation table generation routine as executed upon the computer system shown in FIG. 1.

The invention, which is embodied in a software routine 200 shown in FIG. 2, operates as follows:

The routine begins by creating an m-dimensional grid which samples $R^m$, an m-dimensional color space image. For example, if $R^m$ is in an RGB color space, then, at step 204, the routine creates, in memory, a table G. The table contains a grid that illustratively consist of 32×32×32 elements P. This grid is referred to as an interpolation table G. In each element P of table G, the routine places an n-dimensional value $H(i_1, i_2, \ldots i_m)=(h_1, h_2, \ldots h_n)$. These values of H are initialized using a default mapping from color space $R^m$ to color space $R^n$. For example, if $R^m$ is RGB and $R^n$ is CMYK, the default transformation can be given by a standard transformation with a particular UCR or GCR black generation strategy.

At step 206, the routine defines an interpolation function $S(x_1, x_2, \ldots x_m)=(s_1, s_2, \ldots s_n)$ based on the present elements H in the grid. For example, S can be the tri-linear interpolation of the entries H in G. With the interpolation defined, S is then a function from $R^m$ to $R^n$ The goal is to set the elements H in G such that the function S accurately inverts the given transformation function T(x).

In order to establish the values H, the routine looks for colors in $R^n$ that transform, according to the forward transformation T, to locations in $R^m$ near the samples in the interpolation table G. In order to achieve this goal, the routine stores with each element P, a distance D(P) to the nearest sample found thus far. If the method subsequently finds a closer sample, the routine updates G(P) and D(P). D(P) is initialized to the largest representable value at the beginning of the method.

Specifically, the source for the colors C is a source image containing a collection of pixels x in $R^n$ that ideally spans the range of colors of interest. For each x in C, the routine, at step 208, computes y=T(x). The routine, at step 210, then finds the point P in G which is closest to y. If, at step 212, D(P) is less than a distance Q between y and P, the method, at step 214, sets G(P) to y and D(p) to Q. Through step 216, the routine repeats this operation for all the pixels in the source image.

If, at step 212, the distance D(P) of a point P in the grid G is not zero, then T(G(P)) is not exactly equal to P. In order to reduce or eliminate this error, the routine, at step 218, uses a second phase in which, for each point P in the grid G, the routine minimizes the squared error $(T(G(P))-P)^2$ by modifying value H. This produces a continuous minimization of the H values over m-variables and can be done using simple gradient descent, or a coarse-to-fine search technique. These techniques and other more sophisticated continuous minimization methods are well described in the literature (c.f. Practical Optimization, Gill et. al.. Academic Press 1984).

It is possible that the table resulting from the second phase, i.e., an updated table G containing modified H values, can be insufficiently smooth if the colors in the source image do not cover the entire color space. Consequently, there will be a transition region between the portion of G(P) which still contains the original default mapping and the portion that contains the updated mapping based on the source image. To ensure that there are no objectionable artifacts produced by this boundary, the routine, at step 220, smoothes the values H in G in a third phase. Any low-pass filter may be used for this smoothing operation. For mappings from RGB to CMYK using a 32×32×32 table, averaging each CMYK sample H with its 9 neighbors produces acceptable results. The routine ends at step 222.

Figure 3:
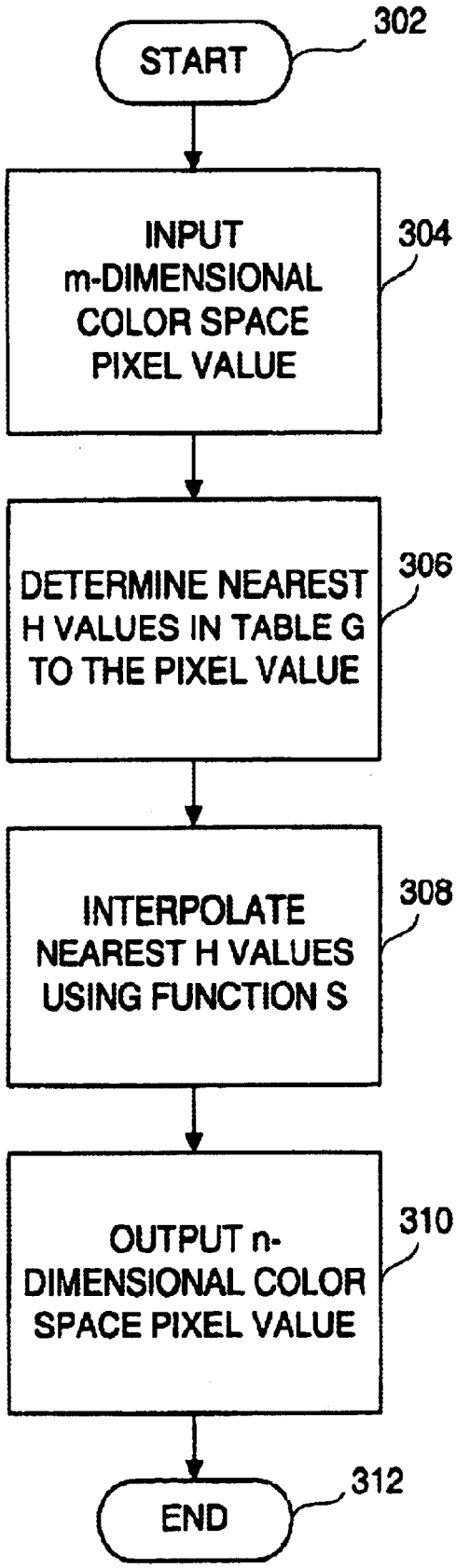
FIG. 3 depicts a flow chart of a color space transformation routine that uses the table generated using the routine depicted in FIG. 2.

Using the grid G and the interpolation function S, any input pixel value from an m-dimensional color space is accurately transformed into a pixel value in an n-dimensional color space. FIG. 3 depicts a flow chart of a transformation routine 300 that performs such a dimensional transformation upon input pixel values.

The routine is entered at step 302 and proceeds to step 304. At step 304, an pixel value from an m-dimensional color space, e.g., RGB color space, is input. At step 306, the routine determines the H values in the table G that are nearest the input pixel value. The nearest H values are, at step 308, interpolated using the interpolation function S. At step 310, the routine outputs a pixel value in n-dimensional color space, e.g., CMYK color space. Lastly, the routine ends at step 312.

In operation, the two routines (FIGS. 2 and 3) have obtained quite satisfactory results transforming colors from RGB to CMYK using the conventional tri-linear interpolant. The resulting transformation has the property for RGB to CMYK transformation that it reproduces very accurately the black generation in the original CMYK file. In experiments, the observed errors typically on the order of one or two percent of the original CMYK values.

Using the present invention within an image editing system, an operator can convert a series of images from CMYK to RGB, re-touch or edit the images in RGB, and then transform the result back into CM, knowing that the black-generation of the resulting CMYK image will very closely match the original black-generation.

Although one embodiment incorporating the teachings of the present invention has been shown and described in detail herein, those skilled in the art can readily devise many other varied embodiments that still incorporate these teachings.

I claim:

[1. For use in a method for editing color data wherein original CMYK data is converted to RGB color data and the RGB color data is edited to provide modified RGB color data, a method for converting modified RGB color data to modified CMYK color data, the method comprising:

providing original CMYK data; and utilizing at least a portion of the original CMYK color data for converting modified RGB color data to modified CMYK color data;

wherein said utilizing comprises constructing an RGB-to-CMYK conversion table that contains a plurality of RGB table entries, and said constructing an RGB-to-CMYK conversion table includes, transforming at least a portion of the original CMYK data to RGB data;

locating, for at least one of the plurality of RGB table entries, candidate CMYK data, from the original CMYK data, which transforms into RGB data in proximity to the RGB table entries; and associating with at least one of the plurality of RGB table entries corresponding CMYK color data, based upon the candidate CMYK data.]

[2. The method of claim 1 further comprising initializing, for at least one of the RGB table entries, corresponding CMYK color data, according to a default RGB-to-CMYK transformation.]

[3. The method of claim 2 and wherein the default RGB-to-CMYK transformation is based upon a default black generation function.]

[4. The method of claim 1 and wherein said constructing an RGB-to-CMYK conversion table further comprises smoothing at least a portion of the corresponding CMYK data associated with a least one of the plurality of RGB table entries, by means of a smoothing filter.]

[5. A method for converting RGB color data to converted CMYK color data, the RGB color data being derived from original CMYK color data, the method comprising:

providing original CMYK color data; and utilizing at least a portion of the original CMYK color data for converting RGB color data to converted CMYK color data;

wherein said utilizing comprises constructing an RGB-to-CMYK conversion table that contains a plurality of RGB table entries, and said constructing an RGB-to-CMYK conversion table includes, transforming at least a portion of the original CMYK data to RGB data;

locating, for at least one of the plurality of RGB table entries, candidate CMYK data, from the original CMYK data, which transforms into RGB data in proximity to the RGB table entries; and associating with at least one of the plurality of RGB table entries corresponding CMYK color data, based upon the candidate CMYK data.]

[6. The method of claim 5 further comprising initializing, for at least one of the RGB table entries, corresponding CMYK color data, according to a default RGB-to-CMYK transformation.]

[7. The method of claim 6 and wherein the default RGB-to-CMYK transformation is based upon a default black generation function.]

[8. The method of claim 5 and wherein said constructing an RGB-to-CMYK conversion table further comprises smoothing at least a portion of the corresponding CMYK data associated with at least one of the plurality of RGB table entries, by means of a smoothing filter.]

[9. For use in editing color data wherein CMYK data is converted to RGB color data and the RGB color data is edited to provide modified RGB color data, a system for converting modified RGB color data to modified CMYK color data, the system comprising:

a source of original CMYK data; and a color converter, utilizing at least a portion of the original CMYK data for converting modified RGB color data to modified CMYK color data;

wherein said color converter includes a table constructor, constructing an RGB-to-CMYK conversion table, that contains a plurality of RGB table entries, and the table constructor includes, a color transformer, transforming at least a portion of the original CMYK data to RGB data;

a data finder, locating, for at least one of the plurality of RGB table entries, candidate CMYK data, from the original CMYK data, which transforms under said color transformer to RGB data in proximity to the RGB table entries; and a data processor, associating with at least one of the plurality of RGB table entries corresponding CMYK color data, based upon the candidate CMYK data.]

[10. The system of claim 9 and further comprising a data initializer, initializing, for at least one of the RGB table entries, corresponding CMYK color data, according to a default RGB-to-CMYK transformation.]

[11. The system of claim 10 and wherein the default RGB-to-CMYK transformation is based upon a default black generation function.]

[12. The system of claim 9 and wherein said table constructor further comprises a data smoother, smoothing at least a portion of the corresponding CMYK data associated with at least one of the plurality of RGB table entries, by means of a smoothing filter.]

[13. A system for converting RGB color data to converted CMYK color data, the RGB color data being derived from original CMYK color data, the system comprising:

a source of original CMYK color data; and a color converter, utilizing at least a portion of the original CMYK color data for converting RGB color data to converted CMYK color data;

wherein said color converter comprises a table that contains a constructor, constructing an RGB-to-CMYK conversion table a plurality of RGB table entries, and said table constructor includes, a color transformer, transforming at least a portion of the original CMYK data to RGB data;

a data finder, locating, for at least one of the plurality of RGB table entries, candidate CMYK data, from the original CMYK data, which transforms under said color transformer to RGB data in proximity to the RGB table entries; and a data processor, associating with at least one of the plurality of RGB table entries corresponding CMYK color data, based upon the candidate CMYK data.]

[14. The system of claim 13 and further comprising a data initializer, initializing, for at least one of the RGB table entries, corresponding CMYK color data, according to a default RGB-to-CMYK transformation.]

[15. The system of claim 14 and wherein the default RGB-to-CMYK transformation is based upon a default black generation function.]

[16. The system of claim 13 and wherein said table constructor further comprises a data smoother, smoothing at least a portion of the corresponding CMYK data associated with at least one of the plurality of RGB table entries, by means of a smoothing filter.]

*17. A method for converting second multi-dimensional color space data to converted first multi-dimensional color space data, the second multi-dimensional color space data being derived from original first multi-dimensional color space data, comprising:*

*utilizing at least a portion of the original first multi-dimensional color space data for converting second multi-dimensional color space data to converted first multi-dimensional color space data,*

*wherein said utilizing comprises constructing a second multi-dimensional color space data-to-first multi-dimensional color space data conversion table that contains a plurality of second multi-dimensional color space data table entries, and said constructing the second multi-dimensional color space data-to-first multi-dimensional color space data conversion table includes:*

*transforming at least a portion of the original first multi-dimensional color space data to second multi-dimensional color space data;*

*locating, for at least one of the plurality of second multi-dimensional color space data table entries, candidate first multi-dimensional color space data, from the original first multi-dimensional color space data, which transforms into second multi-dimensional color space data in proximity to the second multi-dimensional color space data table entries; and*

*associating with at least one of the plurality of second multi-dimensional color space data table entries corresponding first multi-dimensional color space data, based upon the candidate first multi-dimensional color space data.*

*18. The method of claim 17, further comprising initializing, for at least one of the second multi-dimensional color space data table entries, corresponding first multi-dimensional color space data, according to a default second multi-dimensional color space data-to-first multi-dimensional color space data transformation.*

*19. The method of claim 18, wherein the default second multi-dimensional color space data-to-first multi-dimensional color space data transformation is based upon a default black generation function.*

*20. The method of claim 17, wherein said constructing the second multi-dimensional color space data-to-first multi-dimensional color space data conversion table further comprises smoothing at least a portion of the corresponding first multi-dimensional color space data associated with at least one of the plurality of second multi-dimensional color space data table entries.*

*21. The method of claim 17 wherein the first multi-dimensional color space is CMYK.*

*22. The method of claim 17 wherein the second multi-dimensional color space is RGB.*

*23. For use in editing color data wherein first multi-dimensional color space data is converted to second multi-dimensional color space data and the second multi-dimensional color space data is edited to provide modified second multi-dimensional color space data, a system for converting modified second multi-dimensional color space data to modified first multi-dimensional color space data, the system comprising:*

*a color converter capable of utilizing at least a portion of original first multi-dimensional color space data and converting modified second multi-dimensional color space data to modified first multi-dimensional color space data,*

*wherein said color converter includes a table constructor capable of constructing an second multi-dimensional color space data-to-first multi-dimensional color space data conversion table that contains a plurality of second multi-dimensional color space data table entries, and the table constructor includes:*

*a color transformer capable of transforming at least a portion of the original first multi-dimensional color space data to second multi-dimensional color space data;*

*a data finder capable of locating, for at least one of the plurality of second multi-dimensional color space data table entries, candidate first multi-dimensional color space data, from the original first multi-dimensional color space data, which transforms under said color transformer to second multi-dimensional color space data in proximity to the second multi-dimensional color space data table entries; and*

*a data processor capable of associating with at least one of the plurality of second multi-dimensional color space data table entries corresponding first multi-dimensional color space data, based upon the candidate first multi-dimensional color space data.*

*24. The system of claim 23, further comprising a data initializer capable of initializing, for at least one of the second multi-dimensional color space data table entries, corresponding first multi-dimensional color space data, according to a default second multi-dimensional color space data-to-first multi-dimensional color space data transformation.*

*25. The system of claim 24, wherein the default second multi-dimensional color space data-to-first multi-dimensional color space data transformation is based upon a default black generation function.*

*26. The system of claim 23, wherein said table constructor further comprises a data smoother capable of smoothing at least a portion of the corresponding first multi-dimensional color space data associated with at least one of the plurality of second multi-dimensional color space data table entries.*

*27. The system of claim 23, further comprising a source of the original first multi-dimensional color space data.*

*28. The system of claim 23 wherein the first multi-dimensional color space is CMYK.*

*29. The system of claim 23 wherein the second multi-dimensional color space is RGB.*

*30. A system for converting second multi-dimensional color space data to converted first multi-dimensional color space data, the second multi-dimensional color space data being derived from original first multi-dimensional color space data, comprising:*

*a color converter capable of utilizing at least a portion of the original first multi-dimensional color space data and converting second multi-dimensional color space data to converted first multi-dimensional color space data;*

*wherein said color converter comprises a table that contains a constructor capable of constructing a second multi-dimensional color space data-to-first multi-dimensional color space data conversion table that contains a plurality of second multi-dimensional color space data table entries, and said table constructor includes:*

*a color transformer capable of transforming at least a portion of the original first multi-dimensional color space data to second multi-dimensional color space data;*

*a data finder capable of locating, for at least one of the plurality of second multi-dimensional color space data table entries, candidate first multi-dimensional color space data, from the original first multi-dimensional color space data, which transforms under said color transformer to second multi-dimensional color space data in proximity to the second multi-dimensional color space data table entries; and*

*a data processor capable of associating with at least one of the plurality of second multi-dimensional color space data table entries corresponding first multi-dimensional color space data, based upon the candidate first multi-dimensional color space data.*

*31. The system of claim 30, further comprising a data initializer capable of initializing, for at least one of the second multi-dimensional color space data table entries, corresponding first multi-dimensional color space data, according to a default second multi-dimensional color space data-to-first multi-dimensional color space data transformation.*

*32. The system of claim 31, wherein the default second multi-dimensional color space data-to-first multi-dimensional color space data transformation is based upon a default black generation function.*

*33. The system of claim 30, wherein said table constructor further comprises a data smoother, smoothing at least a portion of the corresponding first multi-dimensional color space data associated with at least one of the plurality of second multi-dimensional color space data table entries.*

*34. The system of claim 30, further comprising a source of the original first multi-dimensional color space data.*

*35. The system of claim 30 wherein the first multi-dimensional color space is CMYK.*

*36. The system of claim 30 wherein the second multi-dimensional color space is RGB.*

* * * * *